(12) United States Patent
Finn et al.

(10) Patent No.: US 8,309,033 B2
(45) Date of Patent: Nov. 13, 2012

(54) PLASMA TREATMENT APPARATUS AND METHOD

(75) Inventors: Niall Finn, Lethbridge (AU); Ladislav Kviz, Highton (AU); Jurg Schutz, Grovedale (AU); Anthony Farmer, North Epping (AU)

(73) Assignees: Commonwealth Scientific and Industrial Research Organisation, Campbell, ACT (AU); Australian Wool Innovation Limited, Sydney, NSW (AU)

( * ) Notice: Subject to any disclaimer, the term of this patent is extended or adjusted under 35 U.S.C. 154(b) by 95 days.

(21) Appl. No.: 13/018,149

(22) Filed: Jan. 31, 2011

(65) Prior Publication Data

US 2011/0180387 A1    Jul. 28, 2011

Related U.S. Application Data

(63) Continuation of application No. 10/555,543, filed as application No. PCT/AU2004/000562 on Apr. 30, 2004, now abandoned.

(30) Foreign Application Priority Data

May 5, 2003   (AU) ................................ 2003902139
May 5, 2003   (AU) ................................ 2003902140

(51) Int. Cl.
  *B01J 19/08*   (2006.01)
(52) U.S. Cl. .................................. 422/186.05; 204/164
(58) Field of Classification Search ............. 422/186.05; 204/164
  See application file for complete search history.

(56) References Cited

U.S. PATENT DOCUMENTS

| 3,342,721 | A | 9/1967 | Dibelius et al. |
| 5,026,463 | A | 6/1991 | Dinter et al. |
| 5,135,724 | A | 8/1992 | Dinter et al. |
| 5,403,453 | A | 4/1995 | Roth et al. |
| 5,437,844 | A | 8/1995 | Bonner |
| 5,895,558 | A | 4/1999 | Spence |
| 6,416,633 | B1 | 7/2002 | Spence |

FOREIGN PATENT DOCUMENTS

| EP | 0 592 979 A1 | 4/1994 |
| EP | 0 893 535 A1 | 1/1999 |
| JP | 58-065059 A | 4/1983 |
| JP | 59-120637 A | 7/1984 |
| JP | 5-148712 A | 6/1993 |
| JP | 6-096718 A | 4/1994 |
| JP | 7-220895 A | 8/1995 |
| WO | WO 99/04411 A | 1/1999 |
| WO | WO 02/094455 A1 | 11/2002 |

*Primary Examiner* — Kishor Mayekar
(74) *Attorney, Agent, or Firm* — Merchant & Gould P.C.

(57) ABSTRACT

A plasma treated gas permeable material is produced by applying an alternating voltage between spaced electrodes, at least one of which is covered with a dielectric barrier and at least one of which comprises a plurality of discrete electrode segments, to generate plasma microdischarges between the spaced electrodes. A gas permeable material is passed between or adjacent to the spaced electrodes. A gas is moved between the electrode segments into and through the space between the electrodes and through the gas permeable material. The gas flows over plasma generation surfaces of the respective electrode segments and is moved at a rate whereby the gas flow between the spaced electrodes is turbulent and so randomises the plasma microdischarges and disperses plasma products that would otherwise give rise to burning instabilities in the gas permeable material, whereby the randomized plasma microdischarges provide a generally uniform plasma treatment of the gas permeable material. Also disclosed is an apparatus for laying out the process.

48 Claims, 2 Drawing Sheets

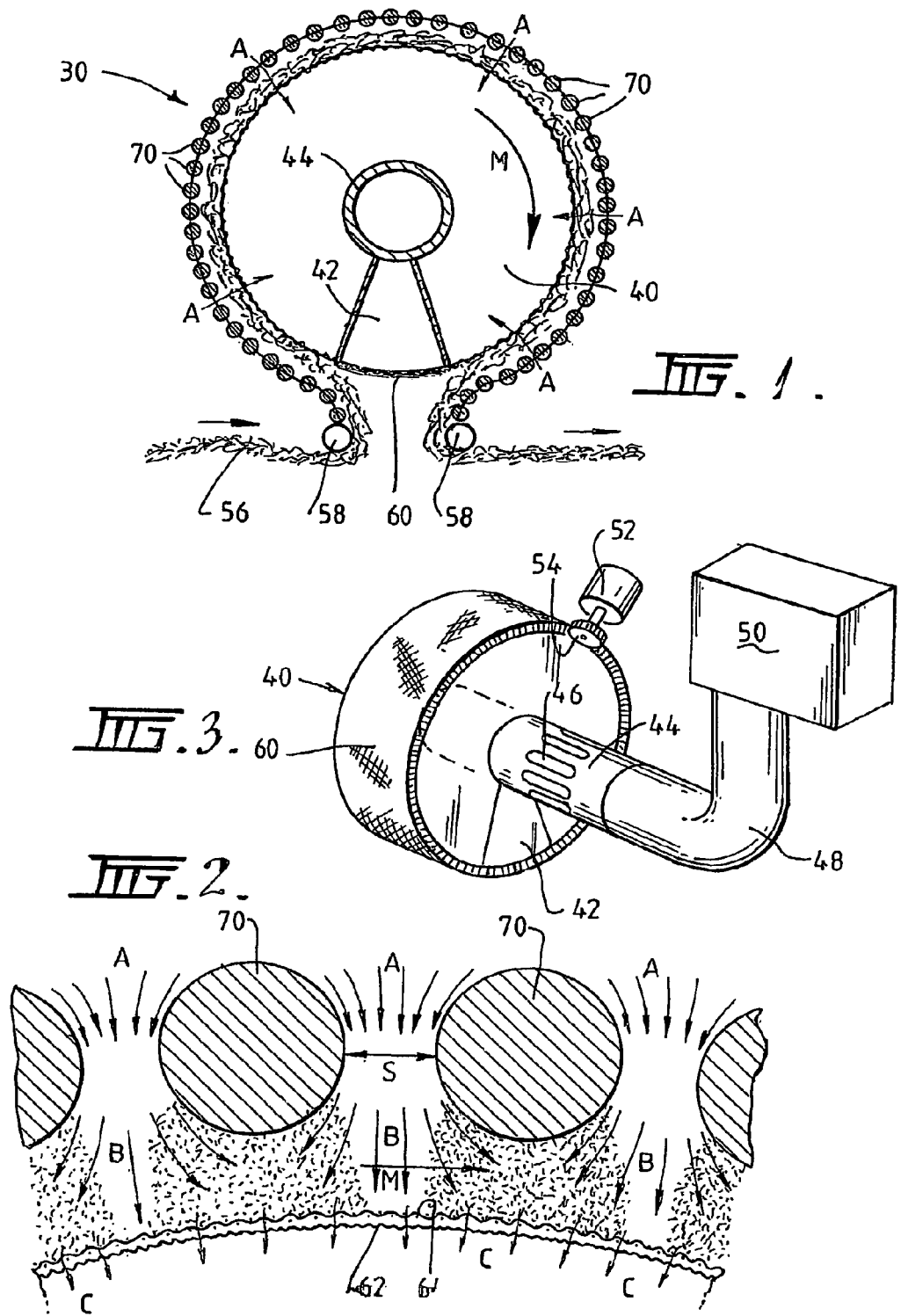

PLASMA TREATMENT APPARATUS AND METHOD

This application is a Continuation of Ser. No. 10/555,542, filed 4 Nov. 2004, which is a National Stage Application of PCT/AU2004/000562, filed 30 Apr. 2004, which claims benefit of Ser ial No. 2003902139, filed 5 May 2003 in Australia and Serial No. 2003902140, filed 5 May 2003 in Australia and which applications are incorporated herein by reference. To the extent appropriate, a claim of priority is made to each of the above disclosed applications.

FIELD OF THE INVENTION

This invention relates to a method and apparatus for the plasma treatment of gas permeable materials, for instance, fibrous materials. The invention is particularly useful when applied to wool.

BACKGROUND OF THE INVENTION

Plasma treatment of materials is widely used to alter the surface, characteristics of the material. The treatment is generally useful where it is uniformly distributed over the surface of the material. When applied to woof fibres, plasma treatments are used to oxidize a lipid layer on the surface of the fibres. Oxidation of the lipid layer makes the wool fibres more receptive to subsequent surface treatments, for instance anti-shrink and pilling-prevention treatments.

Removal of the lipid layer also increases friction between the fibres. This benefits yarn production processes as less twisting is required to form the yarn. The lower twisting level enables the yarn to be produced at a greater rate, enabling downstream processes to be run faster and thereby increasing output. Additionally, yarns having a lower twist exhibit a softer feel relative to higher twist yarns and may be used advantageously to produce commercially desirable softer garments in contrast to garments made from high twist yarn.

Plasma treatment of wool and other fibrous materials should provide an even surface treatment to ensure that the material is receptive to downstream processing in a production line. If the surface of the material is not treated evenly, the downstream processes will not have their designed effect and an inferior product will result.

Another aspect of plasma treatment is that wool and other fibrous materials are susceptible to being locally burnt during the plasma treatment. Again, in a production line, this is highly undesirable where a continuous supply of material is required. Hence, an optimum plasma treatment should minimise the incidence of localised burning of the material being treated.

Some of the present techniques for the generation of plasma for treating materials involves the adjustment of the applied voltage and its frequency in order to obtain a stable uniform plasma. Such plasma is usually generated with gas pressures above or below atmospheric pressure. More recently, advances in plasma treatments at atmospheric pressure have involved the use of expensive noble gases to stabilise the plasma in a uniform glow suitable for surface treating materials. The cost of plasma treatments above or below atmospheric pressure or involving noble gases makes them less economically viable. Accordingly, interest has been focussed on plasma treatments in air and at atmospheric pressure.

Roth et al, in U.S. Pat. No. 5,403,453, teaches that a uniform glow discharge plasma is created at one atmosphere where ions, produced by the electrical breakdown of helium and/or air, are trapped between the electrodes. Roth indicates that the ion trapping increases the lifetime of the ions in the plasma and thereby results in a lower electrical breakdown threshold and a uniform glow discharge. A similar theory is posited in U.S. Pat. No. 6,299,948 to Gherardi et al assigned to L'Air Liquide. According to Roth et al., such trapping is enabled by applying an electrical field alternating at radio frequencies between spaced electrodes. Roth et al. propose a relationship between electrode spacing, electrode voltage and applied frequency that results in ion trapping.

International patent publication WO 02/094455 discloses a plasma treatment at atmospheric pressure in which a spatially homogenous distribution of microdischarges is achieved over an elongated discharge electrode, by introducing a gas stream at an inclination to the longitudinal axis of symmetry. The relatively complex structure involves multiple channels from a gas distribution chamber.

U.S. Pat. No. 5,895,558 describes a plasma treatment station for polymer strip at about atmospheric pressure, but preferably slightly superatmospheric pressure, in which gas is blown from an array of holes in one of a pair of closed-spaced planar electrodes. Turbulent high flow gas delivery is employed to delay and disrupt the formation of a filamentary discharge.

It is an object of the invention to provide an improved plasma treatment technique for use with gas permeable materials.

SUMMARY OF THE INVENTION

The inventors have recognised that the poor uniformity of normal atmospheric plasma is due to ions, remaining from a previous cycle of plasma generation, causing electrical breakdown to be concentrated through those ions, ie at the same points. A normal dielectric barrier discharge plasma consists of multiple micro-discharges each of a few nanoseconds duration. The plasma is driven by an alternating high voltage applied between the electrodes. Each half-cycle of alternating voltage plasma is generated through a burst of microdischarges. The ions from each microdischarge do not normally disperse easily and, having lower electrical resistance compared to the surrounding gas, cause the microdischarges to occur repeatedly at the same locations. This provides very poor uniformity of treatment and fails to use all of the available gas for generation of useful chemical species by the plasma.

Further, the localisation of microdischarges increases the probability of generation of a high temperature instability within the plasma that burns the material to be treated. This seems to occur due to the local release by the plasma of particular chemicals from the material surface, possibly where a high concentration of contaminant occurs. The generation of these chemicals changes the nature of the plasma and causes localised excessive absorption of plasma energy and a rapid rise in temperature. Localisation of the microdischarges is believed to result in two effects. Firstly, ions remaining stationary relative to the electrodes cause localisation of the plasma microdischarges between the electrodes and result in uneven and less effective surface treatment. Secondly, trapping of ions and plasma-material by-products in a gas permeable material moving relative to the electrodes causes localisation of the plasma relative to the material and can result in burning of the material.

It has further been recognised that the localisation of the plasma microdischarges prevents use of the whole gas volume available in generating the plasma and thus limits the concentration of the active species that beneficially modify the surface chemistry of the material.

The invention, therefore, uses a strong gas flow through the gas permeable material to prevent the formation of localised plasma microdischarges by dispersing and/or removing ions and undesirable chemicals during and between alternating voltage cycles from between the electrodes or from within the gas permeable material. Thus, the invention provides uniform and effective plasma treatment at voltages, frequencies and electrode separations outside the parameters dictated by Roth's theory. Rather than generating a uniform glow discharge as claimed by Roth and others the present invention provides an effective uniform plasma surface treatment using a filamentary but randomised dielectric barrier discharge plasma and without burning the material to be treated.

The invention provides, in a first aspect, a method of producing a plasma treated gas permeable material, including the steps of:

(a) applying an alternating voltage between spaced electrodes, at least one of which is covered with a dielectric barrier and at least one of which comprises a plurality of discrete electrode segments, to generate plasma microdischarges between the spaced electrodes;

(b) passing a gas permeable material between or adjacent to said spaced electrodes; and (c) moving a gas between said electrode segments into and through the space between the electrodes and through the gas permeable material, the gas flowing over plasma generation surfaces of the respective electrode segments and being moved at a rate whereby the gas flow between the spaced electrodes is turbulent and so randomises the plasma microdischarges and disperses plasma product that would otherwise give rise to burning instabilities in the gas permeable material;

whereby the randomized plasma microdischarges provide a generally uniform plasma treatment of the gas permeable material.

It will be appreciated that moving the gas through the space between the electrodes disperses and/or removes ions remaining stationary relative to the electrodes. Furthermore, ions caught in the gas permeable material are dispersed and/or removed by the gas moving through the material. Thus the next plasma microdischarge does not repeat at the same point as the previous plasma-microdischarge. The randomised plasma microdischarges therefore provide a time averaged uniform plasma suitable for uniformly treating the surface of gas permeable materials. Accordingly, a gas permeable material treated by this method has better uniformity of surface characteristics and is less likely to be burned by localized plasma microdischarges.

In the preferred embodiment, the gas moves in a direction transverse to the direction of passage of the gas permeable material between the spaced electrodes.

In a particularly preferred embodiment the method is facilitated by the step of applying, between the electrodes, a voltage that alternates at a frequency to enable the dispersion and/or removal, in the moving gas, of plasma by-products which cause localisation of the plasma microdischarges. Any frequency may be employed, but the frequency may typically be in the range of 1-20 kHz, and is preferably in the range of 1-5 kHz.

As an additional benefit, the moving gas not only removes ions, but also noxious plasma by-products, such as O3 and NO2.

The gas used in the method may be any gas suitable for electrical breakdown to generate a plasma, such as noble gas or a gas inert to the material, but is preferably air. Moreover, the gas used in the method may have a gas pressure above or below atmospheric pressure. Advantageously, the gas pressure is atmospheric pressure.

The voltage applied to the spaced electrodes is typically in the range 10-25 kV.

According to its first aspect, the invention further provides an apparatus for plasma treating a gas permeable material, the apparatus including:

(a) spaced electrode at least one of which is covered with a dielectric barrier and at least one of which comprises a plurality of discrete electrode segments;

(b) means for applying an alternating voltage between said spaced electrodes to generate plasma microdischarges between said spaced electrodes;

(c) means enabling the passage of the gas permeable material between or adjacent to said spaced electrodes; and (d) means for moving a gas between said electrode segments into and through the space between said electrodes and through the gas permeable material, the gas flowing over plasma generation surfaces of the respective electrode segments and being moved at a rate whereby the gas flow between the spaced electrodes is turbulent and so randomises the plasma microdischarges and disperses plasma product that would otherwise give rise to burning instabilities in the gas permeable material;

whereby the randomised microdischarges provide a generally uniform plasma treatment of the gas permeable material.

The voltage applying means preferably applies the voltage to the electrodes at a frequency, that enables the dispersion and/or removal, in the moving gas, of plasma by-products, which cause localisation of the plasma microdischarges. Any frequency may be employed, but the frequency may be in the range 1-20 kHz, and is preferably in the range 1-5 kHz.

The electrodes are spaced advantageously to permit the relative movement therebetween of a material and to minimise the power required to generate the plasma. Preferably, the electrode spacing is in the range 2 to 10 mm, most preferably about 4 mm.

In a preferred embodiment, the spaced electrodes are preferably shaped to permit the movement of the gas through the gas permeable material in a direction transverse to the direction of passage of the material between the spaced electrodes.

In particular, a first of the spaced electrodes may be gas permeable, preferably a mesh.

Neighbouring discrete electrode segments are preferably spaced apart about 0.5 to 2 mm.

The means enabling the passage of the gas permeable material may include a rotatable drum, a curved surface of the drum comprising the first electrode, the second electrode comprising the discrete electrode segments being concentrically arranged about the drum whereby the gas permeable material rides on the first electrode between the first and second electrodes.

The apparatus of the invention, in either aspect, is especially suitable for the treatment of fibrous materials and textiles, for example wool, particularly wool sliver.

In a second aspect of the invention, there is provided an electrode for enabling plasma generation, the electrode including:

(a) an electrically conductive element;

(b) a dielectric sheath about the electrically conductive element; and (c) an electrically conductive liquid medium contacting both the electrically conductive element and the dielectric sheath, whereby the liquid medium forms a uniform contact with the dielectric sheath.

The liquid medium is preferably between the electricity conductive element and the dielectric sheath. The dielectric sheath preferably substantially surrounds or encloses the electrically conductive elements, e.g. so that the latter forms a core of the electrode.

The uniform contact between the liquid medium and the dielectric sheath ensures that the current is distributed evenly across the surface of the dielectric sheath. This facilitates randomized electrical breakdown of the gas between the electrodes, and in consequence a more uniform plasma. It also avoids undesirable concentration of the electric field at sharp points within the electrode structure that increase the probability of dielectric breakdown. This is especially important when thin dielectric media are used, which is preferred in order to maximise the efficiency of coupling of electrical energy to the plasma. The liquid conductor also helps to uniformly distribute heat in the electrodes and so minimise thermal stresses.

The liquid conductor may be transparent and so allow observation and/or optical measurement of the plasma that would not be possible with conventional electrodes.

The liquid medium preferably has a controllably variable electrical conductivity depending on the composition.

While the electrodes of the second aspect of the invention may take any shape, they are preferably elongate and may be cylindrical.

BRIEF DESCRIPTION OF THE DRAWINGS

Preferred embodiments of the invention will now be described, by way of example only, with reference to the accompanying drawings.

FIG. 1 is a cross-sectional schematic view of a plasma treatment apparatus in accordance with a preferred embodiment of the present invention, especially suitable for treating wool sliver;

FIG. 2 is an enlarged cross-sectional view of a portion of the apparatus of FIG. 1;

FIG. 3 is a diagrammatic perspective view of the apparatus of FIG. 1 without the second electrode;

EMBODIMENTS OF THE INVENTION

Figure 4:
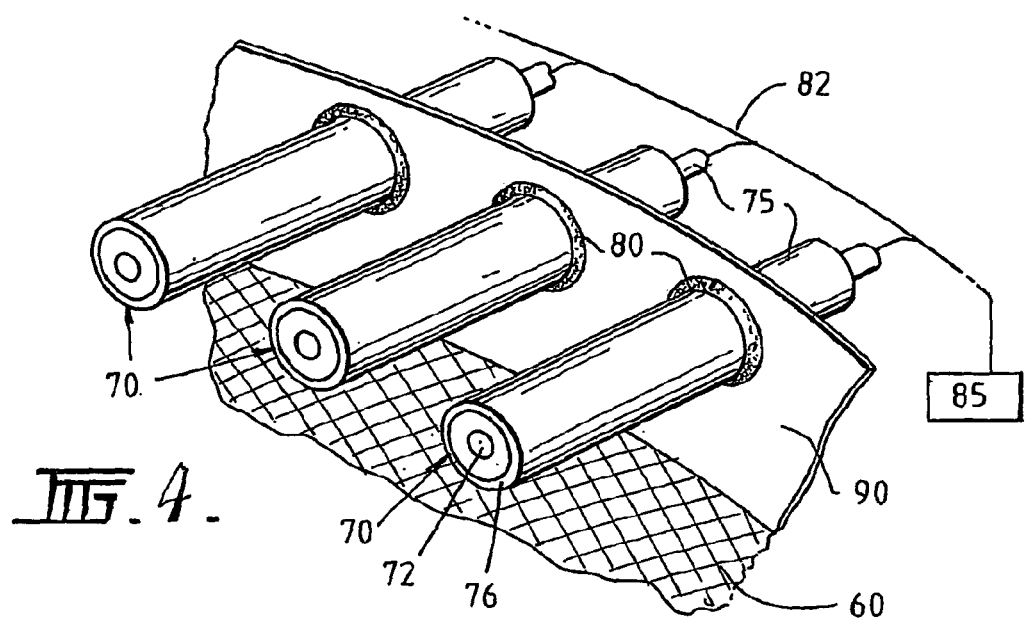
FIG. 4 is a fragmentary perspective view and partial cross-section of the second electrode.

Referring firstly to FIGS. 1 and 2, it will be seen that the plasma treatment apparatus 30 includes a hollow rotatable drum 40 having a first electrode, in the form of a mesh electrode 60, formed on the curved outer surface of the drum 40. The apparatus 30 further includes a second electrode, formed as a plurality of rod electrodes 70, spaced radially outwardly from the mesh electrode 60.

The mesh electrode 60 comprises a coarse mesh 62 supporting an overlying layer of fine mesh 64. The fine mesh 64 prevents localisation of plasma microdischarges by providing a large array of potential plasma forming locations, in contrast to the course mesh 62 where the reduced number of potential plasma forming locations would ordinarily lead to localisation of the plasma microdischarges.

As shown in FIGS. 1 and 3, the drum 40 has a tubular core 44 and a wedge-shaped baffle 42 extending from the core to the outer perimeter of the drum 40. The core 44 extends through the drum 40 and has apertures 46 to permit the flow of a gas from the hollow of the drum 40 to internally of the core 44. The core 44 is attached by a conduit 48 to a suction means 50, in the form of an industrial blower. Furthermore, a motor 52 drives wheel 54, which wheel 54 driveably engages the drum 40 to enable rotational movement of the drum 40 relative to the rod electrodes 70.

A gas permeable material, in this case wool sliver 56, is fed over roller 58 into the apparatus 30 from a source. The wool 56 passes into the space between the mesh electrode 60 and rod electrodes 70 where the wool 56 is subjected to the plasma treatment. The treated wool 56 eventually exits the space and passes over roller 58' into downstream processing equipment.

While suitable plasma treatment of a material depends on the residence time of the material within the plasma, suitable plasma treatments using apparatus 30 have been provided where the rod electrodes 70 cover 0.8 to 1 m of the surface of the drum 40 and the drum 40 is rotated at a rate which moves the wool sliver 56 through the apparatus 30 at a rate approximating 20 m/min.

In operation, the suction means 50 draws a gas, preferably air at ambient atmospheric pressure, between the rod electrodes 70, through the space between the rod electrodes 70 and mesh electrode 60, and through mesh electrode 60 into the hollow of the drum 40 and then into the tubular core 44 via the apertures 46. Alternative gases, such as noble gases, may otherwise be used. While the gas pressure is preferably ambient atmospheric pressure, gas pressures above and below ambient atmospheric pressure may be used. The particular details of airflow between the rod electrode 70 and mesh electrode 60 will be discussed in greater detail at a later point.

As the wool 56 passes into contact with the mesh electrode 60, the air flowing into the hollow of the drum 40 acts to retain the wool 56 in contact with the mesh electrode 60. In this manner, the wool 60, or other similarly gas permeable material, is retained on the mesh electrode 60 without bunching or folding of the wool 56 during its travel relative to the rod electrodes 70. Removal of the wool 56 from contact with the mesh electrode 60 is facilitated by the baffle 42 because air does not move through the segment of the mesh electrode 60 adjacent to the baffle 42. Absence of air moving through the mesh electrode 60 in that segment releases the wool 56 from contact with the mesh electrode 60.

Satisfactory plasma treatment of material has been achieved by applying an alternating voltage of 10 kV to 20 kV between the mesh electrode 60 and rod electrodes 70, at any frequency but preferably in the range of 1 to 5 kHz. While the mesh electrode 60 is grounded, the alternating voltage is applied by a power source 85 to the rod electrodes 70 via cables 82 from a suitable busbar.

As seen in FIG. 2, the airflow A, B and C is transverse to the direction of movement of the wool 56 as indicated by arrow M. In this manner, the gas moves through the space between the mesh electrode 60 and rod electrodes 70, and through the wool 56 into the hollow of the drum 40. Air flowing through the material during passage through the regions without plasma acts to disperse or remove plasma products such as ions and undesirable chemicals which remain stationary relative to the material, thereby preventing the onset of travelling burning instabilities. In an alternative embodiment, the gas flow may be through the space between the mesh electrode 60 and rod electrodes 70, and through the wool 56 in a direction parallel or anti-parallel with the direction of movement of the wool indicated by arrow M.

The rod electrodes 70 are spaced by a distance S such that the inwardly flowing gas A is, as indicated by arrows B, caused to turbulently flow over the plasma generating surfaces of the rod electrodes 70 that are adjacent and opposed to the mesh electrode 60. If the distance S is too great, the inwardly flowing air A flows more slowly and more directly from between adjacently spaced rod electrodes 70 through the mesh electrode 60 with lower air-flow over the surface of the rod electrode 70. However, if the distance S is too small, the burden placed on the suction means 50 increases and a more powerful suction means 50 is required to achieve an airflow rate which removes remaining ions and randomizes the plasma microdischarges. The applicant has found that a rod electrodes 70 spacing S of 0.5 to 2 mm ensures acceptable and achievable turbulent airflow and airflow rates across the surface of the rod electrodes 70 adjacent the mesh electrode 60.

The rod electrodes 70 are optimally spaced from the mesh electrode 60 to enable the travel of the wool 56 therebetween whilst also minimising the power required to generate a plasma microdischarge over that distance. When wool sliver 56 is used in the apparatus 30, the rod electrodes 70 are spaced from the mesh electrode 60 by about 4 mm. However, this distance will vary depending on the gas permeable material placed within the apparatus and may range between 1 and 10 mm.

The air moving through the space between the mesh electrode 60 and rod electrodes 70 disperses and/or removes ions remaining from a previous plasma generation cycle such that subsequent plasma microdischarges are generated at random locations between the rod electrodes 70 and mesh electrode 60 rather than repeatedly generating at the location of the remaining ions. Thus, dispersion and/or removal of the ions remaining stationary relative to the electrodes enables randomisation of the plasma microdischarges to provide a generally randomised plasma for treating the wool 56. Furthermore, the high airflow through the wool 56 enables dispersion and/or removal of ions and other plasma products trapped in the wool 56 and thereby avoids burning of the wool 56 due to small intense hot plasmas localised relative to the wool 56. The avoidance of burning instabilities allows greater power density to be used and so provides greater treatment level or allows greater speed to be used for a given treatment length and/or delivery speed.

Further benefits of the gas movement include (i) turbulent mixing of the gas to make better use of the available gas to generate greater concentrations of the short lived active species that produce the surface treatment of the wool 56, (ii) the delivery of fresh volumes of air for the generation of active species by the plasma and thus an improved plasma treatment of the wool 56, and (iii) removal of noxious plasma by-products, such as O3, NO2, and other fumes.

By way of example, for a 2 mm electrode spacing 5, the air speed between rod electrodes 70 is ideally greater than 1.8 m/s. In general, the minimum air speed depends on the interaction of a variety of parameters, including the power, voltage and frequency, and the material being processed.

As shown in FIG. 4, each rod electrode 70 comprises a conductive core 72, preferably formed of a metallic conductor such as copper. A dielectric sheath, in this instance formed as a glass tube 76 closed at one end, surrounds the core 72. A conductive medium 74 separates the core 72 from the glass tube 76. The material filling the space between the conductor and the glass may be electrically conducting or nonconducting but is preferably conducting to minimise the thickness of the dielectric barrier and to maximise the uniformity of the electrode.

In an embodiment of the second aspect of the invention, medium 74 is an electrically conductive liquid medium 74. The liquid medium 74 may consist of water or other suitable conductive liquid.

The conductive liquid medium 74, in this case water, takes on the shape of the interior surface of the glass tube 76, thus forming a uniform and intimate contact across the entire interior surface of the glass tube. The uniformity of the contact ensures a more even distribution of current, and therefore electrical charge, over the glass tube. Such uniform current distribution thereby facilitates randomization of plasma microdischarges, thus providing a more even plasma treatment of a material. The intimate contact between the liquid 74 and the dielectric 77 also maximises the smoothness of the contact between the conductor and the dielectric, reducing localised concentrations of the electric field that could result in electrical breakdown of the dielectric material. The liquid conductor also more uniformly dissipates heat, reducing thermally generated stresses in the glass or ceramic electrodes. An air space may be provided in a suitable position, not shown, to accommodate expansion and contraction of the liquid with changes in temperature. The use of liquid conductors also facilitates the use of dielectric covered electrodes of more complex shapes than otherwise possible. Dielectric materials may be shaped by any means into complex configurations, for instance a coiled glass tube, then filled easily with liquid conductors.

The liquid conductor may be transparent and so allow observation and/or optical measurement of the plasma that would not be possible with conventional electrodes.

The liquid medium preferably has a controllably variable electrical conductivity depending on the composition. For example, the inclusion of selected additives in the liquid controls the electrical conductivity. Controlled conductivity may be used to prevent momentary localisation of the electrical energy density over the electrode area on time scales that can generate damaging instabilities.

The conductive medium 74 is retained inside the tube 76 by a bung (not shown), through which bung protrudes an exposed end of the core 72. The end of the core 72 is connected to an electrical power source by wire 82 for providing the alternating voltage to the rod electrodes 70.

One particular arrangement of the rod electrodes 70 is shown in FIG. 4. The rod electrodes 70 are seated in apertures in wall 90, which extend radially outwardly from the drum 40. Seals 80 electrically insulate an exposed end 75 of the core 72, which is connected to a power source by wire 82, from arcing with the mesh electrode 60 located on the opposite side of the wall 90. This arrangement is used where the same alternating voltage is applied to the rod electrodes 70 whilst keeping the mesh electrode 60 grounded such that the plasma microdischarges are generated between the rod electrodes 70 and mesh electrode 60.

Figure 5:
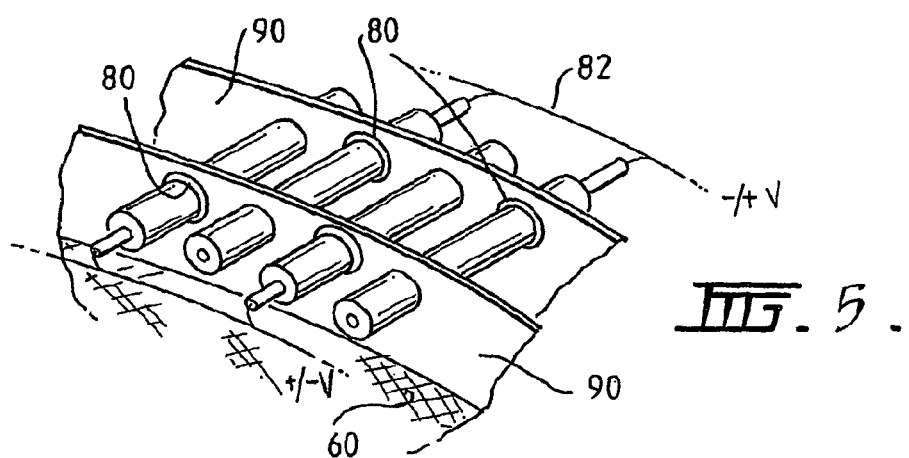
FIG. 5 is a perspective view of an alternative arrangement of the second electrode.

In the alternative arrangement shown in FIG. 5, the rod electrodes 70 are interleaved such that when the alternating voltage is applied, adjacent rod electrodes 70 have opposite polarity but an electrical potential of the same magnitude. Accordingly the sliver 56 is moved along adjacent to the spaced rod electrodes 70. In this manner, the plasma microdischarges are generated between adjacent rod electrodes 70 rather than between the rod electrode 70 and mesh electrode 60. Thus, the alternating voltage can be halved in contrast to the arrangement in FIG. 4, ie +/−10 kV, such that the same 20 kV potential difference between adjacent rod electrodes 70 is still generated.

The electrical excitation to generate the plasma can be applied by grounding either electrode 60 or 70 while applying the full time varying voltage to the other electrode 70 or 60, respectively. Alternatively the voltage may be applied at any combination of frequencies and voltages to both electrodes simultaneously such that there is a time varying potential difference between them adequate to generate the required plasma.

One safety feature which may be used on the apparatus 30 is a pair of windows located adjacent of the baffle and through which the wool 56 enters and exits from the space between the rod electrodes 70 and mesh electrode 60. The windows are dimensioned to permit the travel of wool 56 therethrough, however, the size and shape of the windows are selected to prevent a user inserting their hand or fingers into the space between the rod electrodes and mesh electrode, thereby preventing electrocution of the user.

The apparatus may further include the safety feature of a lockable gate opposite the segment of the drum 40 which is adjacent the baffle 42. The gate preferably includes a logic switch that enables operation of the apparatus only when the gate is locked, thus preventing access to the drum 40 by a user when the apparatus 30 is operating.

While the baffle 40 assists to release the wool 56 from the mesh electrode 60, occasionally a portion of the wool 56 remains attached and proceeds to re-enter the space for plasma treatment between the rod electrode 70 and mesh electrode 60. In this case, the stuck portion of wool 56 is overlapped with a freshly introduced portion of wool 56. Their combined thickness may exceed the spacing between the rod electrode 70 and mesh electrode 60 and result in damage or breakage of the rod electrodes 70. To prevent this overlapping, an optical sensor is provided opposite the baffle such that when a stuck portion of wool 56 is sensed, the apparatus 30 is shut down. To avoid recurring shut down of the apparatus by stray wool fibres, or other dust particles, the sensor is programmed to trigger shut down of the apparatus only when optical interference of the sensor exceeds 0.25 seconds.

Figure 6:
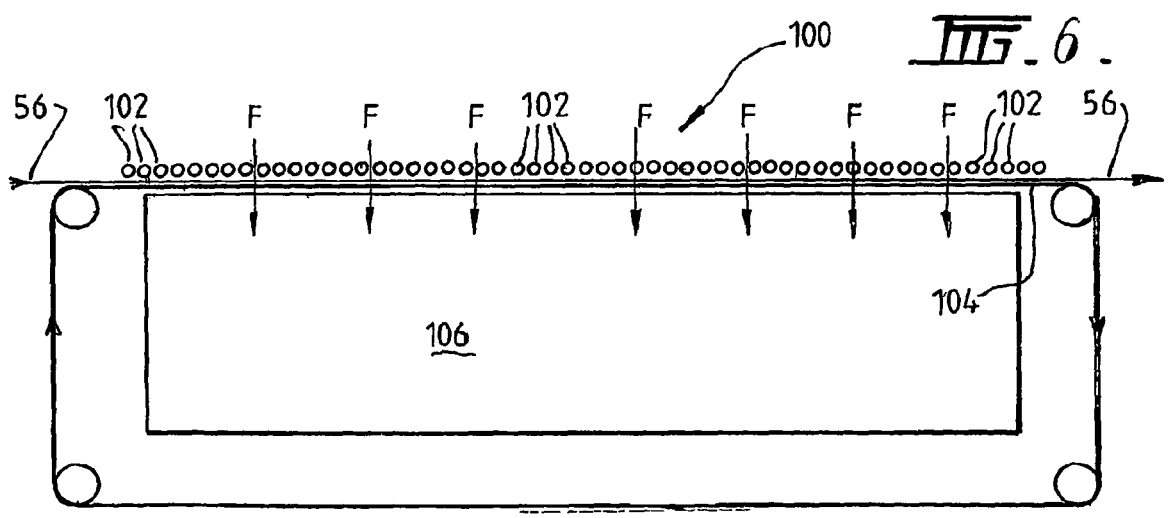
FIG. 6 is a cross-sectional view of a plasma treatment apparatus in accordance with an alternative embodiment of the invention.

FIG. 6 shows an alternative apparatus 100 for plasma treating wool slivers 56. Instead of a rotating drum, the apparatus 100 carries the wool sliver 56 on an endless belt of mesh 104 which forms an electrode. Alternatively the mesh may be of an electrically insulating material and covers a structure that forms the second electrode. Spaced above the mesh belt 104 are rod electrodes 102 formed in the same manner as the rod electrodes 70 of the previously described embodiment. The spacing between electrodes 102 and mesh 104 and between adjacent electrodes 102 is set to have the same effect on the airflow as described in the earlier embodiment. The structure supporting the mesh may also be shaped such that it directs the air-flow preferentially around the dielectric covered rod-electrodes, for instance by being arranged in a pattern similar to the rod-electrode pattern but with spaces arranged directly below the dielectric covered rod-electrodes. A suction means 106 causes air to flow in the direction of the arrows marked F such that the airflow is through the sliver 56 and is transverse to the direction of travel of the sliver 56. In this manner, active species created by the plasma generated between the electrodes 102 and mesh 104 is drawn through the sliver 56, thereby treating the sliver 56.

The interleaved electrode 70 assembly concept of FIG. 5 may equally be applied to the apparatus 100 such that plasma is generated between adjacent electrodes 102. Again, the plasma products are drawn through the sliver 56, which travels adjacently to the electrodes 102, by the transverse air flow F by the suction means 106. This arrangement produces a treatment gradient in the sliver 56, i.e. the top fibres of the sliver 56 have greater surface treatment than fibres located deeper within the sliver. If a uniform fibre treatment is desired, the sliver may be inverted and passed through the apparatus a second time, or using a second apparatus 106 after inverting the sliver.

The invention claimed is:

1. Apparatus for plasma treating a gas permeable material, the apparatus including:
    a) spaced electrodes, at least one of which comprises a plurality of discrete electrode segments, the other electrode being gas permeable, wherein at least one of the electrodes is covered with a dielectric barrier and the electrodes are arranged to enable the passage of a gas permeable material between or adjacent to the spaced electrodes;
    (b) one or more electrical conductors arranged and configured to be connected to a power source for applying an alternating voltage between said spaced electrodes to generate filamentary plasma microdischarges between the spaced electrodes; and
    (c) an arrangement configured to move a gas between the electrode segments into and through a space between the electrodes, through the gas permeable material, and through the gas permeable electrode, the gas flowing over plasma generation surfaces of the respective electrode segments and being moved at a rate such that the gas flow between the spaced electrodes is turbulent and so randomises the plasma microdischarges and disperses plasma products that would otherwise give rise to burning instabilities in the gas permeable material;
    whereby the randomised microdischarges provide a generally uniform plasma treatment of the gas permeable material.

2. Apparatus according to claim 1, wherein the gas permeable electrode is a mesh electrode.

3. Apparatus according to claim 2, wherein said mesh electrode comprises a course mesh supporting an overlying layer of fine mesh.

4. Apparatus according to claim 2, wherein the gas permeable electrode is a curved surface of a rotatable drum, the segmented electrode comprising said electrode segments being concentrically arranged about the drum whereby the gas permeable material rides on the gas permeable electrode between the gas permeable and the segmented electrodes.

5. Apparatus according to claim 4, wherein said drum is a hollow rotatable drum.

6. Apparatus according to claim 4, wherein said electrode segments are respective rod electrodes.

7. Apparatus according to claim 2, wherein said electrode segments are respective rod electrodes.

8. Apparatus according to claim 7 wherein neighbouring electrodes segments of said discrete electrode segments are spaced apart about 0.5 to 2 mm.

9. Apparatus according to claim 2, further including the power source for applying the alternating voltage, wherein the power source is arranged to apply the voltage at a frequency that enables the dispersion and/or removal, in the moving gas, of plasma by-products, which cause localisation of the plasma microdischarges.

10. Apparatus according to claim 9 wherein said frequency is in the range 1-20 kHz.

11. Apparatus according to claim 10, wherein said electrode segments are respective rod electrodes.

12. Apparatus according to claim 2, wherein the spacing between said electrodes is in the range 2 to 10 mm.

13. Apparatus according to claim 1, wherein the gas permeable electrode is a curved surface of a rotatable drum, the segmented electrode comprising the electrode segments being concentrically arranged about the drum wherein the gas permeable material rides on the gas permeable electrode between the gas permeable and segmented electrodes.

14. Apparatus according to claim 13, wherein said drum is a hollow rotatable drum.

15. Apparatus according to claim 13, wherein the spacing between said electrodes is in the range 2 to 10 mm.

16. Apparatus according to claim 15, wherein said electrode segments are respective rod electrodes.

17. Apparatus according to claim 1 wherein said plasma generation surfaces of said electrode segments are opposed to the other of said spaced electrodes, being transversely curved elongate surfaces.

18. Apparatus according to claim 1, wherein said electrode segments are respective rod electrodes.

19. Apparatus according to claim 18 wherein neighbouring electrodes segments of said discrete electrode segments are spaced apart about 0.5 to 2 mm.

20. Apparatus according to claim 1, wherein neighbouring electrodes segments of said discrete electrode segments are spaced apart about 0.5 to 2 mm.

21. Apparatus according to claim 1, further including the power source of said voltage arranged to apply the voltage at a frequency that enables the dispersion and/or removal, in the moving gas, of plasma by-products, which cause localisation of the microdischarges.

22. Apparatus according to claim 21 wherein said frequency is in the range 1-20 kHz.

23. Apparatus according to claim 21 wherein said frequency is in the range 1-5 kHz.

24. Apparatus according to claim 1, wherein the spacing between said electrodes is in the range 2 to 10 mm.

25. Apparatus according to claim 1, wherein said spaced electrodes are shaped to permit the movement of the gas through the gas permeable material in a direction transverse to the direction of passage of the material between the spaced electrodes.

26. Apparatus according to claim 1, wherein said each of said electrode segments comprises:
(a) an electrically conductive element;
(b) a dielectric sheath about the electrically conductive element; and
(c) an electrically conductive liquid medium contacting both the electrically conductive element and the dielectric sheath, whereby the liquid medium forms a uniform contact with the dielectric sheath.

27. Apparatus according to claim 26 wherein said liquid medium is between the electrically conductive element and the dielectric sheath.

28. Apparatus according to claim 27, wherein said dielectric sheath substantially surrounds or encloses the electrically conductive elements so that the latter forms a core of the electrode segment.

29. Apparatus according to claim 26 wherein said liquid medium is transparent.

30. Apparatus according to claim 26, wherein said liquid medium has a controllably variable electrical conductivity depending on the composition.

31. Apparatus according to claim 26, wherein said electrode segment is elongate and generally cylindrical.

32. A method of producing a plasma treated gas permeable material, including the steps of:

(a) applying an alternating voltage between spaced electrodes to generate filamentary plasma microdischarges between the spaced electrodes, at least one of the electrodes comprising a plurality of discrete electrode segments, the other electrode being gas permeable, and at least one of the electrodes being covered with a dielectric barrier;
(b) passing a gas permeable material between or adjacent to said spaced electrodes; and
(c) moving a gas between said electrode segments, into and through the space between the electrodes and through the gas permeable material and gas permeable electrode, the gas flowing over plasma generation surfaces of the respective electrode segments and being moved at a rate such that the gas flow between the spaced electrodes is turbulent and so randomises the plasma microdischarges and disperses plasma products that would otherwise give rise to burning instabilities in the gas permeable material;
the randomized microdischarges providing a generally uniform plasma treatment of the gas permeable material.

33. A method according to claim 32 wherein said plasma generation surfaces of said electrode segments are opposed to the other of said spaced electrodes, being transversely curved elongate surfaces.

34. A method according to any claim 32, wherein said electrode segments are respective rod electrodes.

35. A method according to claim 34, wherein said alternating voltage is applied at a frequency that enables the dispersion and/or removal, in the moving gas, of plasma by-products, which cause localisation of the plasma microdischarges.

36. A method according to claim 35, wherein said frequency is in the range 1-20 kHz.

37. A method according to claim 32, wherein said alternating voltage is applied at a frequency that enables the dispersion and/or removal, in the moving gas, of plasma by-products, which cause localisation of the microdischarges.

38. A method according to claim 37, wherein said frequency is in the range 1-20 kHz.

39. A method according to claim 37, wherein said frequency is in the range 1-5 kHz.

40. A method according to claim 37, wherein said fibrous material is wool.

41. A method according to claim 40, wherein said frequency is in the range 1-20 kHz.

42. A method according to claim 32, wherein said gas is moved through the gas permeable material in a direction transverse to the direction of passage of the material between said spaced electrodes.

43. A method according to claim 32 wherein said gas is air.

44. A method according to claim 43 wherein the air pressure of said air as it moves through the space between said electrodes and through the gas permeable material is substantially atmospheric pressure.

45. A method according to claim 32 wherein the voltage applied to the spaced electrodes is in the range 10-25 kV.

46. A method according to claim 32, wherein said gas permeable material is a fibrous material.

47. A method according to claim 46, wherein said fibrous material is wool.

48. A method according to claim 46, wherein said fibrous material is wool sliver.

* * * * *

UNITED STATES PATENT AND TRADEMARK OFFICE
CERTIFICATE OF CORRECTION

PATENT NO. : 8,309,033 B2  
APPLICATION NO. : 13/018149  
DATED : November 13, 2012  
INVENTOR(S) : Niall Finn et al.

It is certified that error appears in the above-identified patent and that said Letters Patent is hereby corrected as shown below:

Title page (63) Related U.S. Application Data: 10/555,543 should read -- 10/555,542 --

Signed and Sealed this  
Twenty-fifth Day of June, 2013

Teresa Stanek Rea  
*Acting Director of the United States Patent and Trademark Office*